(12) United States Patent
Park et al.

(10) Patent No.: US 10,975,196 B2
(45) Date of Patent: Apr. 13, 2021

(54) METHOD FOR PURIFYING POLYALKYLENE CARBONATE

(71) Applicant: LG CHEM, LTD., Seoul (KR)

(72) Inventors: Seung Young Park, Daejeon (KR); Jung Min Sohn, Daejeon (KR)

(73) Assignee: LG Chem, Ltd., Seoul (KR)

(*) Notice: Subject to any disclaimer, the term of this patent is extended or adjusted under 35 U.S.C. 154(b) by 23 days.

(21) Appl. No.: 16/338,686

(22) PCT Filed: May 9, 2018

(86) PCT No.: PCT/KR2018/005320
§ 371 (c)(1),
(2) Date: Apr. 1, 2019

(87) PCT Pub. No.: WO2018/208082
PCT Pub. Date: Nov. 15, 2018

(65) Prior Publication Data
US 2020/0010616 A1    Jan. 9, 2020

(30) Foreign Application Priority Data

May 10, 2017  (KR) .................. 10-2017-0058273

(51) Int. Cl.
*C08G 64/40* (2006.01)
*C08G 64/02* (2006.01)

(52) U.S. Cl.
CPC ....... *C08G 64/406* (2013.01); *C08G 64/0208* (2013.01)

(58) Field of Classification Search
USPC ...................................................... 528/491
See application file for complete search history.

(56) References Cited

U.S. PATENT DOCUMENTS

| | | |
|---|---|---|
| 3,074,921 A | 1/1963 | Carter |
| 4,981,948 A | 1/1991 | Kawachi et al. |
| 6,274,777 B1 | 8/2001 | Gray et al. |
| 9,340,646 B2 | 5/2016 | Soler et al. |
| 2003/0212280 A1 | 11/2003 | Kahn |
| 2011/0201779 A1 | 8/2011 | Cherian et al. |
| 2016/0145431 A1 | 5/2016 | Cho et al. |
| 2018/0305542 A1* | 10/2018 | Lee ............... C08L 69/00 |

FOREIGN PATENT DOCUMENTS

| | | |
|---|---|---|
| JP | 2001-226426 A | 8/2001 |
| JP | 2006-506324 A | 2/2006 |
| JP | 2006-104093 A | 4/2006 |
| KR | 10-1993-0003163 B1 | 4/1993 |
| KR | 10-2011-0055739 A | 5/2011 |
| KR | 10-2013-0044223 A | 5/2013 |
| KR | 10-2014-0118881 A | 10/2014 |
| KR | 10-2014-0135549 A | 11/2014 |
| KR | 10-2016-0066391 A | 6/2016 |
| KR | 10-2016-0121046 A | 10/2016 |
| KR | 10-2016-0121871 A | 10/2016 |

OTHER PUBLICATIONS

Edward G. Scheibel, Performance of an Internally Baffled Multistage Extraction Column, Scheibel, Edward G., A. I. Ch. E. Journal, Mar. 1956, pp. 74-78, https://doi.org/10.1002/aic.690020116. (Year: 1956).*

Erwan Colomb et al., "Heterogeneous catalytic ring opening polymerization of 2,2-dimethyltrimethylene carbonate with metal alkoxides as initiators in protic conditions", Macromolecular Chemistry and Physics, vol 200, Issue 11, 1999, pp. 2525-2532.

* cited by examiner

*Primary Examiner* — Terressa Boykin
(74) *Attorney, Agent, or Firm* — Dentons US LLP

(57) ABSTRACT

The present invention relates to a method for purifying polyalkylene carbonate. More specifically, a method for purifying polyalkylene carbonate is provided, which uses a multistage extraction column having the number of stages of at least 10 stages, using water for effectively removing by-products such as alkylene carbonate generated in a process for producing polyalkylene carbonate resin, thereby controlling the content of by-products to a certain level or less through a continuous operation, particularly, the extraction is performed at room temperature, thereby easily removing by-products in the resin without a high temperature volatilization.

9 Claims, 1 Drawing Sheet

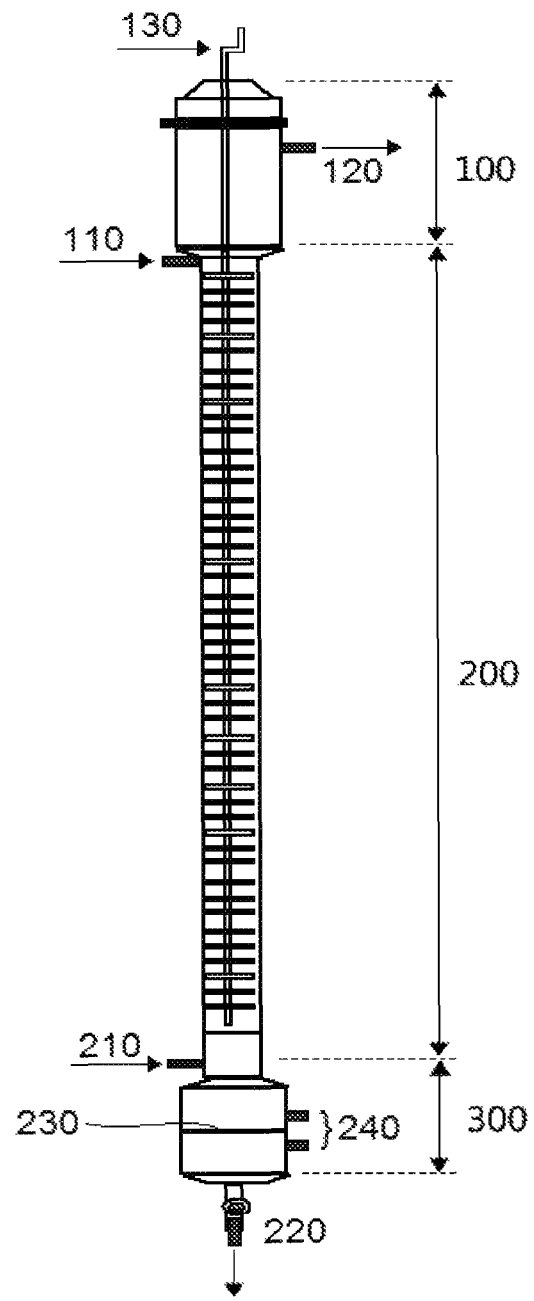

METHOD FOR PURIFYING POLYALKYLENE CARBONATE

TECHNICAL FIELD

Cross-Reference to Related Application(s)

This application is a National Stage Application of International Application No. PCT/KR2018/005320, filed on May 9, 2018, which claims priority to and the benefits of Korean Patent Application No. 10-2017-0058273, filed on May 10, 2017, with the Korean Intellectual Property Office, the disclosure of which is incorporated herein by reference in its entirety.

The present invention relates to a method for purifying polyalkylene carbonate for effectively removing by-products generated in a process for producing polyalkylene carbonate resin through a continuous operation.

BACKGROUND ART

Polyalkylene carbonate is a non-crystalline transparent resin and has only an aliphatic structure, unlike an aromatic polycarbonate, which is a similar type of engineering plastic. Polyalkylene carbonate is synthesized by a copolymerization reaction using carbon dioxide and epoxide as direct monomers (main raw materials) in the presence of a catalyst. Polyalkylene carbonate has advantages in that it has excellent transparency, elongation, and oxygen barrier properties, exhibits biodegradability, is completely decomposed into carbon dioxide and water during combustion, and leaves no carbon residue.

However, in the process of copolymerization using carbon dioxide and epoxide as monomers, approximately 3 to 20% of alkylene carbonate as a polymerization by-product is produced relative to the resin depending on the polymerization conditions. When the monomer is ethylene oxide, the polymerization by-product becomes ethylene carbonate (hereinafter referred to as EC). The ethylene carbonate serves as a plasticizer in the resin, and when the content is high, there is a problem that a glass transition temperature (Tg) of the resin is lowered, the resin is made very flexible, the strength is decreased, and adherence between the resins is increased. Consequently, when the resin is finally pelletized, the resin and the pellet are strongly adhered to each other, which serves to make handling difficult during processing. Therefore, for stably processing into a film or a sheet using a resin, the content of EC present in the resin should be controlled within an appropriate level through additional steps after polymerization.

Meanwhile, in order to remove polymerization by-products, methods such as devolatilization under high-temperature and high-vacuum conditions have been traditionally often used. The EC has a very high boiling point of 246° C., whereas polyalkylene carbonate is easily decomposed at 180° C. or higher and produces EC by a backbiting reaction. Therefore, when trying to remove the EC under ordinary high-temperature and high-vacuum conditions, an additional decomposition reaction is promoted, which finally makes it difficult to control the content of EC in the resin.

Therefore, a new method for minimizing the content of by-products such as EC in final resins is required.

DETAILED DESCRIPTION OF THE INVENTION

Technical Problem

It is an object of the present invention to provide a method for purifying polyalkylene carbonate capable of improving physical properties of final resin products by minimizing the content of by-products such as EC generated in a process for producing polyalkylene carbonate.

Technical Solution

The present invention provides a method for purifying polyalkylene carbonate including the steps of:

providing a polymerization solution of polyalkylene carbonate including a polyalkylene carbonate, a by-product, and a solvent; and continuously removing by-products from the polymerization solution by a multistage extraction method using water at room temperature, wherein the multistage extraction method is performed in a multistage extraction column having at least 10 or more plural stages and equipped with a stirrer so as to maintain a feed linear velocity of 0.1 to 1 cm/s, wherein the rotating speed of the stirrer is 100 to 200 rpm, and wherein a ratio between water and the polymerization solution of polyalkylene carbonate (S/F ratio) (Solvent/Feed ratio) is 1:1 to 5:1.

Hereinafter, the present invention will be described in more detail. Terms and words used in the present specification and claims are not restrictively interpreted as meanings generally used in the dictionary, but should be interpreted as the meaning and concept coincident with the technical sprit of the present invention on the basis of a fundamental rule that an inventor can suitably define the concept of corresponding terms to describe his or her invention using the best method.

In addition, the terms "comprises" and/or "comprising" when used in this specification, specify the presence of stated features, regions, integers, steps, operations, members, elements, and/or components, but do not preclude the presence or addition of one or more other features, regions, integers, steps, operations, members, elements, and/or components.

Hereinafter, a method for purifying a polyalkylene carbonate resin according to a preferred embodiment of the present invention will be described in more detail.

According to one embodiment of the present invention, a method for purifying polyalkylene carbonate is provided, including the steps of: providing a polymerization solution of polyalkylene carbonate including a polyalkylene carbonate, a by-product, and a solvent; and continuously removing by-products from the polymerization solution by a multistage extraction method using water at room temperature, wherein the multistage extraction method is performed in a multistage extraction column having at least 10 or more plural stages and equipped with a stirrer so as to maintain a feed linear velocity of 0.1 to 1 cm/s, wherein the rotating speed of the stirrer is 100 to 200 rpm, and wherein a ratio between water and the polymerization solution of polyalkylene carbonate (S/F ratio) (Solvent/Feed ratio) is 1:1 to 5:1.

The present invention provides a method for purifying polyalkylene carbonate which minimizes the content of by-products through continuous multistage extraction using water, taking account of the fact that by-products such as EC have very high solubility in water and that an organic solvent capable of dissolving polyalkylene carbonate and water was phase-separated.

Specifically, in the process of treating by-products, the present invention is characterized in providing a method for effectively removing by-products such as EC present in a polymer solution obtained after polymerization, through a continuous multistage extraction with water at room temperature rather than at a high temperature as in the existing process.

In particular, the present invention can effectively remove by-products present in the polymerization solution by adding a certain amount of water to a polymerization solution of polyalkylene carbonate polymerized under a chlorinated solvent such as methylene chloride. At this time, the organic solvent and water are phase-separated, and the by-products which are dissolved in an organic solvent layer by the mixing are transferred to a water layer, and thus the by-product content of the organic solvent layer is reduced.

Therefore, the present invention provides a polyalkylene carbonate resin capable of reducing stickiness of the product and having excellent strength, thereby minimizing the content of by-products present in the polyalkylene carbonate resin finally obtained without using a volatilization method.

Each step of the purification method of polyalkylene carbonate of the present invention will be described in more detail.

The step of providing a polymerization solution of polyalkylene carbonate including a polyalkylene carbonate, a by-product, and a solvent may be performed through polymerization of a monomer containing carbon dioxide and an epoxide compound in the presence of a catalyst and a solvent according to methods that are well known in the art.

The method may further include a step of purifying the monomer, before the polymerization step of the monomer. This step is one of purifying and preparing an epoxide compound and carbon dioxide, etc. for use in the reaction.

Specifically, according to the above method, the carbon dioxide, the alkylene oxide compound, and the solvent used as raw materials are purified before polymerization so that the water content of the monomer is maintained at less than 10 ppm. In addition, it is possible to perform the process of passing raw materials through a column filled with a molecular sieve. Thus, the step of purifying the monomer includes passing the monomer through a column packed with a molecular sieve to purify the monomer so that the water content of the monomer is less than 10 ppm.

Further, the polymerization step performed after the above step is one of preparing a polyalkylene carbonate by charging raw materials in a polymerization reactor and performing the polymerization in the presence of a catalyst.

The copolymerization of the alkylene oxide with carbon dioxide can be performed in the presence of a metal complex compound such as zinc, aluminum, or cobalt.

Thus, the polymerization step according to one preferred embodiment of the present invention may include a step of feeding a catalyst, a solvent, an epoxide compound, and carbon dioxide to a polymerization reactor, and then performing solution polymerization of a monomer containing an epoxide compound and carbon dioxide in the presence of a catalyst and a solvent. Such polymerization may also be batch or continuous polymerization.

After completion of the solution polymerization, a reaction mixture is formed, and such reaction mixture includes polyalkylene carbonate, unreacted residual monomers, catalyst residues, solvents, and by-products. The unreacted residual monomer includes unreacted carbon dioxide and unreacted alkylene oxide. Further, the solid content after solution polymerization may be about 5 to 50% by weight.

In addition, the polymerization step may be performed at 50 to 100° C. and at 20 to 40 bar for 2 to 20 hours.

After the polymerization step, the unreacted residual monomer is removed, such that a polymerization solution of polyalkylene carbonate containing a polyalkylene carbonate, a by-product, and a solvent is provided. In addition, the polymerization solution of polyalkylene carbonate may further include a catalyst residue and an unreacted residual monomer.

Thus, according to one embodiment of the invention, a reaction mixture including a polyalkylene carbonate, a catalyst residue, an unreacted residual monomer, a solvent, and an alkylene carbonate-containing by-product can be provided.

Further, in the solution polymerization, alkylene carbonate, which is a by-product, can be produced in the process of decomposing the polymer via backbiting by a catalyst and heat and in the polymerization mechanism. When the by-product excessively remains in the resin, it may excessively lower the glass transition temperature to exert an adverse influence, for example, lower the strength and cause adhesion between the final pellet products. Therefore, it is preferable to control the content of the by-product to a certain level or less relative to the resin in the purification step of the preparation method of polyalkylene carbonate. Such by-products may include an alkylene carbonate having 2 to 5 carbon atoms, for example, ethylene carbonate.

The number of carbon atoms in the alkylene carbonate means the number of carbon atoms of alkylene, which includes a substituted or unsubstituted alkyl group having 1 to 3 carbon atoms.

After the above process, in the present invention, a step of removing by-products from the polymerization solution is performed by using a multistage extraction method using water at room temperature.

According to the present invention, as by-products are removed by a multistage extraction method using water after completion of the polymerization, the content of byproducts can be controlled to a certain level or less, thereby improving the physical properties of the resin.

The present invention uses a multistage extraction method using water in order to control the content of by-products in the polyalkylene carbonate resin to the target level or less. The method of the present invention can provide a resin having the by-product content intended at a certain number of stages or more, for example, having the by-product content of 2 wt % or less in the resin.

Particularly, since the multistage extraction process using water can be operated at room temperature, it does not require high temperature conditions as in the existing process. The organic solvent and water including a polymer polymerization solution flow into the countercurrent in the multi-stage extraction column and allow the by-product in the polymer solution to extract into a water layer. Therefore, it is possible to obtain a polymer solution in which by-products in the final resin are removed effectively compared to the existing process.

More specifically, low-density water flows into the lower part of the multistage extraction column, and a high-density polymer solution flows into the upper part of the multistage extraction column. Therefore, in the multistage extraction column, a polymer solution of the upper part and water of the lower part are mixed, and by-products are extracted and transferred to the water layer. In addition, the water with low density that has undergone the extraction process is allowed to escape to the top of the column, and the polymer solution layer with high density in which byproducts has been removed and the content of by-products has been minimized is allowed to escape to the bottom of the column. Thereafter, the polyalkylene carbonate resin can be obtained through a series of steps of removing the organic solvent from the polymer solution collected through the lower part of the extraction column.

In this regard, according to the process for continuously producing polyalkylene carbonate, a multistage extraction column is used and purification using water is performed a specific number of times.

The multistage extraction method may be performed at least three times at room temperature, or may be performed using a multistage extraction column having 10 or more stages. In this process, it is possible to remove water via decanting after mixing for extraction.

More preferably, the multistage extraction method can be performed three to ten times using water at room temperature, or ten times or more if necessary. The number of extractions basically depends on the initial content of alkylene carbonate in the feed, the content of alkylene carbonate remaining in the polymerization solution after extraction, or the content of the alkylene carbonate remaining in the polyalkylene carbonate resin. In the above extraction method, if the number of extractions is small, there is a problem that by-products are not completely removed from the polymerization solution. In addition, if the number of extractions is increased more than necessary, there is a problem that the economic efficiency of the process is lowered.

In order to maximize the extraction efficiency with a large number of stages, the multistage extraction method may be performed in a multistage extraction column equipped with a stirrer that maintains a specific stirring speed. Since the rotating speed of the stirrer affects the degree of dispersion and the droplet size, it is preferable to mechanically stir the multistage extraction column within a certain range. Preferably, for example, the multistage extraction method may be performed using a stirrer having at least 10 or more plural stages and maintaining a rotating speed of 100 to 200 rpm or 150 to 180 rpm. If the rotating speed of the stirrer is 100 rpm or less, the droplets of the polymerization solution are not reduced to a sufficient size for extraction and the extraction efficiency becomes very low. If the rotating speed is 200 rpm or more, there may be a problem of the polymerization solution flooding from the top of the column. Therefore, when the rotating speed of the stirrer is maintained within the above range, the efficiency of the by-product extraction from the polymerization solution can be maximized.

The multistage extraction column can efficiently treat the by-product from the polymerization solution when maintaining the stirring speed, and at the same time, maintain the flow velocity of the feed at a certain range of linear velocity. Specifically, it is preferable that the multistage extraction column maintains a feed linear velocity of 0.1 to 1 cm/s or 0.3 to 0.6 cm/s. The linear velocity means a linear velocity of the continuous phase (organic layer) associated with the throughput of the feed. The maximum extraction rate at each linear velocity can be measured under the conditions of a maximum mechanical repetition rate of the porous plate (rpm, that is, the maximum rpm just before the flooding phenomenon occurs). If the linear velocity of the multistage extraction column is 0.1 cm/s or less, there is a problem that the economic efficiency of the process is lowered. If the linear velocity is more than 1 cm/s, there is a problem that extraction efficiency becomes low or the possibility of the occurrence of the flooding phenomenon increases.

In the multistage extraction process, the ratio between the extraction solvent (water) and the feed (polymerization solution of polyalkylene carbonate) (S/F ratio) (Solvent/Feed ratio) may be 1:1 to 5:1, and more preferably 1:1 to 3:1 or about 1:1 to 2:1. The ratio between the extraction solvent (water) and the feed (polymerization solution of polyalkylene carbonate) (S/F ratio) (Solvent/Feed ratio) means a weight ratio. Further, if the S/F ratio does not satisfy 1:1 and the water content is too small, there is a problem that sufficient extraction is not performed. If the S/F ratio does not satisfy the range of 5:1 and the content of water is too large, unnecessary water is excessively used and the economic efficiency of the process is decreased. In addition, when the S/F ratio is about 1:1 to 3:1 or about 1:1 to 2:1, by-products from the polymerization solution can be more efficiently treated.

The viscosity of the polymerization solution of polyalkylene carbonate may be 10 to 500 cP or 50 to 300 cP. If the viscosity of the polymerization solution is low, an unnecessarily large amount of solvent is used, which leads to a decrease in the economic efficiency. If the viscosity is too high, the droplets of the organic phase are not made sufficiently small in the water phase by the stirrer in the extraction column, which leads to a decrease in the extraction efficiency. The viscosity of the polymerization solution is measured using a viscosity measuring instrument such as a Brookfield viscometer.

Further, the multistage extraction column may include a multistage countercurrent extraction column for liquid-liquid extraction which is partitioned into at least ten or more plural stages by a perforated plate and has an extraction unit having at least one baffle plate.

As a preferable example, when performing multistage extraction using water, a multistage countercurrent extraction column as shown in the Drawing may be used. The multistage countercurrent extraction column includes an extraction unit 200 in which a substantial extraction process (that is, a mass transfer phenomenon of a solute) is performed, an upper fixing part 100 provided at an upper part of the extraction unit, and a lower fixing part 300 provided at a lower part of the extraction unit.

As shown in the Drawing, the extraction unit 200 is partitioned into a plurality of stages, preferably at least 10 stages, by a plurality of parallel perforated plates. A feed inlet 110 is provided near the interface between the extraction unit 200 and the upper fixing part 100, and a solvent inlet 210 may be provided near the interface between the extraction unit 200 and the lower fixing part 300. In addition, a drive assembly 130 may be provided at an upper part of the upper fixing part 100.

That is, in the case of the liquid-liquid extraction process, the substance to be extracted may exist in a heavy phase or a light phase depending on the density of the substance to be extracted, extraction solvent, raffinate, and the like. In the case of liquid-liquid countercurrent extraction, the positions of the feed inlet 110 and the solvent inlet 210 may vary depending on the physical properties (e.g., density, etc.) of feed, extraction solvent, extracted phase, raffinate, etc.

Therefore, in the case of the extraction column of the present invention, it is configured to have a structure in which a feed, which is a heavy phase, is charged in the upper part of the extraction unit 200, the feed comes into contact with an extraction solvent charged in the lower part of the extraction unit 200, the extracted phase is discharged to the upper part of the extraction unit 200, and the raffinate is discharged to the lower part of the extraction unit 200. In this case, in the present invention, the heavy phase is a polymerization solution of polyalkylene carbonate (i.e., a polymer solution) and represents a feed. In addition, the light phase means water used as an extraction solvent.

The term 'feed' as used herein means a liquid mixture containing a solute to be extracted, and includes a polymerization solution of polyalkylene carbonate including a polyalkylene carbonate, a by-product, and a solvent. The feed may also be a mixture of a solute having solubility in the extraction solvent and other inert materials having no solubility. Here, when the extraction solvent is added to the feed, the solute is dissolved from the feed into the extraction solvent due to a mass transfer phenomenon. Hence, the extraction solvent in which a considerable amount of solute is dissolved forms an extract phase, and the feed in which a considerable amount of solute is removed forms a raffinate.

Therefore, in the present invention, since water is used as an extraction solvent, the by-product, which is a solute, is dissolved in water and transferred to an extraction phase, and the feed from which most of solute has been removed forms a raffinate. That is, the feed is fed to the uppermost stage of the extraction unit 200 via the feed inlet 110, and goes down sequentially from the uppermost stage through each stage. Water, which is an extraction solvent, is fed to the lowermost stage of the extraction unit 200 via the solvent inlet 210, and goes up sequentially via each stage from the lowermost stage. In this process, the feed, and water which is an extraction solvent, are brought into contact with each other, and by-products contained in the feed are dissolved in water by a mass transfer phenomenon. Then, the extraction solvent in which a considerable amount of by-product has been dissolved is discharged to an extraction phase outlet 120 via the uppermost stage of the extraction unit 200 and the upper fixing part 100. Then, the feed in which a considerable amount of by-products has been removed is discharged to a raffinate outlet 220 via the lowest stage of the extraction unit 200 and the lower fixing part 300.

At this time, an interface 230 between a heavy phase and a light phase is generated in the lower fixing part 300, and an interface control unit 240 for controlling the interface may be provided on a side surface of the lower fixing part 300. The interface control unit allows the phase separation to be observed with the naked eye, and can be operated so that the interface can be controlled up and down as necessary.

Meanwhile, in order to make the mass transfer phenomenon of by-products occur more smoothly, mechanical stirring of the extraction column can be performed.

The extraction unit 200 of the multistage countercurrent extraction column has a substantially uniform inner diameter, and the perforated plates placed in each stage may have a substantially uniform free area ratio.

Also, as described above, the extraction column is provided with the feed inlet 110 and the extraction solvent inlet 210.

The feed inlet 110 may be located at the uppermost side of the extraction unit 200 which is near the interface between the extraction unit 200 and the upper fixing part 100. In addition, the polymerization solution of polyalkylene carbonate which is a heavy phase is charged through the feed inlet 110.

The extraction solvent inlet 210 may be located at the lowermost side of the extraction unit 200 which is near the interface between the extraction unit 200 and the lower fixing part 300. The extraction solvent (water), which is a light phase, is charged in the extraction solvent inlet 210.

In addition, the extraction unit 200 is partitioned into 10 to 150 stages, and the total length may be 1 to 50 m.

Specifically, the extraction unit 200 of the multistage countercurrent extraction column according to the present invention may be partitioned into a plurality of stages, preferably at least 10 stages, and more preferably 10 to 150 stages, by perforated plates. The total length of the extraction unit 200 (i.e., the distance from the uppermost stage to the lowermost stage) may be 1 to 50 m. However, the total number of stages and the length of the extraction unit 200 can be variously controlled within the above-mentioned range or other ranges according to the specific type of extraction column, the scale of extraction process, and the like.

Further, in the arrangement of the perforated plate of the extraction unit 200, the plate geometry arranges at least one plates so as to have a free open space through which the feed can pass at regular intervals. For example, the perforated plate may be composed of a top plate and a bottom plate as shown in the Drawing. The top plates have a free open space of about 54.9% through which the feed can pass, and the bottom plates may have a free open space of about 34.7%.

At least one baffle plate may be installed at upper and lower parts of the perforated plate of the extraction unit 200 at a predetermined interval. The baffle plate may mean a refractory plate or compartment installed to direct the flow of feed and extraction solvent in the required direction. The material of the baffle plate may include refractory materials that are well known in the art.

The specific type of the multistage countercurrent extraction column according to the present invention is not particularly limited as long as it satisfies the above-described structure. By way of a non-limiting example, the extraction column of the present invention may include a multistage countercurrent extraction column such as a Karr-type column, a rotating disc contactor column, a Scheibel column, or a pulsed column.

After the above process, a step of removing a solvent from the polymerization solution from which the by-product has been removed may be further performed.

The method for removing the solvent is not particularly limited, and generally well-known volatilization methods can be used.

The materials used in the step of preparing the polymerization solution will be described in more detail as follows.

The epoxide compound may include: an alkylene oxide having 2 to 20 carbon atoms which is substituted or unsubstituted with a halogen or an alkyl group having 1 to 5 carbon atoms; a cycloalkylene oxide having 4 to 20 carbon atoms which is substituted or unsubstituted with a halogen or an alkyl group having 1 to 5 carbon atoms; and a styrene oxide having 8 to 20 carbon atoms which is substituted or unsubstituted with a halogen or an alkyl group having 1 to 5 carbon atoms. More preferably, the epoxide compound may include an alkylene oxide having 2 to 20 carbon atoms which is substituted or unsubstituted with a halogen or an alkyl group having 1 to 5 carbon atoms. Further, specific examples of the epoxide compound include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxy norbornene, limonene oxide, dieldrin, 2,3-epoxypropylbenzene, styrene oxide, phenyl propylene oxide, stilbene oxide, chlorostilbene oxide, dichloro stilbene oxide, 1,2-epoxy-3-phenoxypropane, benzyloxymethyloxirane, glycidyl-methylphenyl ether, chlorophenyl-2, 3-epoxypropyl ether, epoxypropyl methoxyphenyl ether, biphenyl glycidyl ether, glycidyl naphthyl ether, and the like. Preferably, the epoxide compound is ethylene oxide.

The carbon dioxide may be charged continuously or discontinuously during the reaction, but is preferably continuously charged. In this case, it is preferable to use a continuous type or a semi-batch type as the polymerization reactor. If the carbon dioxide is not continuously charged, the production of by-products such as polyethylene glycol may be increased apart from the carbonate copolymerization reaction intended in the present invention. In addition, when carbon dioxide is continuously charged in the polymerization, the reaction pressure may be 5 to 50 bar or 10 to 40 bar.

In addition, the carbon dioxide may be charged at a molar ratio of 1:1 to 10:1 based on the epoxide compound. More preferably, the carbon dioxide may be charged at a molar ratio of 2:1 to 5:1 based on the epoxide compound. Further, when carbon dioxide is charged at the above ratio, it is preferable to use a semi-batch type system as the polymerization reactor.

The catalyst used in the present invention may include a metal complex compound such as zinc, aluminum, or cobalt, and preferably, a zinc-based catalyst is used. The type of the zinc-based catalyst is not limited, and it may include zinc complex compounds that are well known in the art.

Further, the catalyst may be charged at a molar ratio of 1:50 to 1:1000 based on the epoxide compound, and more preferably, it can be charged at a molar ratio of 1:70 to 1:600, or 1:80 to 1:300. If the ratio is less than 1:50, it is difficult to exhibit sufficient catalytic activity during solution polymerization, and if the ratio exceeds 1:1000, it is not efficient due to the use of an excessive amount of catalyst, and by-products may be produced, the molecular weight may decrease due to backbiting of the polymer due to heating in the presence of the catalyst, and the amount of cyclic carbonate produced may increase.

In addition, the solvent is preferably used at a weight ratio of 1:0.1 to 1:100 based on the epoxide compound, and more preferably at a weight ratio of 1:1 to 1:10.

As the solvent, methylene chloride or ethylene dichloride may be used, and more preferably, methylene chloride may be used.

Advantageous Effects

According to the present invention, in the purification step after polymerization of the polyalkylene carbonate resin, the polymerization by-products are removed by a multistage extraction method under specific conditions using water before removing a solvent from the polymerization solution, thereby having the effect of providing an improved physical property to the final resin product. In particular, the present invention can control the content of by-products to a certain level or less through continuous operation, thereby improving product performance. That is, according to the present invention, the by-product content in the resin is 2% by weight or less based on the total weight of the final polyalkylene carbonate resin, and the by-product content in the resin can be minimized without using a high temperature volatilization method. In the present invention, byproducts adversely affecting the physical properties of the product after polymerization can be removed continuously at room temperature, thereby realizing improved physical properties of the resin.

BRIEF DESCRIPTION OF DRAWINGS

The Drawing shows the configuration of a multistage countercurrent extraction column according to an embodiment of the present invention.

DETAILED DESCRIPTION OF THE EMBODIMENTS

Hereinafter, preferred examples of the present invention will be described in detail. It is to be understood, however, that these examples are for illustrative purposes only and are not to be construed as limiting the scope of the present invention.

Preparation Example 1

Polyethylene carbonate resin was continuously produced after connecting and installing a polymerization reactor, a water feed tank for removing by-products, a centrifugal dryer, an extruder for pelletization, and a pellet recovery device.

As the polymerization reactor, an autoclave reactor equipped with a stirrer was used, and a dry diethyl-zinc catalyst, a solvent, ethylene oxide (EO), and carbon dioxide were charged in this reactor. Solution polymerization was performed under the conditions shown in Table 1 below to prepare polyethylene carbonate. At this time, ethylene oxide (EO), carbon dioxide, and the solvent were purified before polymerization and maintained so that the water content was less than 10 ppm.

TABLE 1

| | | Example 1 |
|---|---|---|
| Cat.amt | (g) | 8 |
| EO | (g) | 180 |
| Solvent (MC) | (g) | 900 |
| | EO/cat. | 99.8 |
| $CO_2$ | (bar) | 40 |
| Temperature | (° C.) | 70 |
| Time | (h) | 4 |
| Yield | (g) | 90.5 |
| Yield | (g/g-cat) | 11 |
| Activity | (g/g-cat.h) | 2.83 |
| Conversion ratio of EO | (%) | 25 |
| TOF | (mol/mol-cat.h) | 6.28 |

Reference Example 1

Using the polymerization solution containing MC and polyethylene carbonate obtained under the conditions of Preparation Example 1, a stepwise extraction experiment was carried out as follows.

(1) One Stage Extraction Experiment

A polymer polymerization solution obtained by polymerization and water were mixed at a weight ratio of 1:1, placed in a beaker, mixed vigorously for 30 minutes, and then left until layer separation occurred. Then, the solvent of the organic solvent layer was removed, and the content of EC was analyzed by NMR. The content of EC before extraction was 14.68%, and the content of EC after extraction was lowered to 10.53%. (Hereinafter, "%" may mean "wt %" of EC in the polymer resin).

(2) One Stage Extraction Experiment (Time Change)

An extraction experiment was carried out in the same manner as in the above (1), except that the mixing time of the polymer solution and water was set low, to 10 minutes from 30 minutes.

As a result, the content of EC before extraction was 14.68%, and the content of EC after extraction was lowered to 10.28%. It can be seen that there is no significant difference in the extraction results of 10 minutes and 30 minutes.

Reference Example 2

Multistage Extraction Experiment of Number of 3 Times

The polymerization solution obtained by polymerization of polyethylene carbonate and water were mixed at a weight ratio of 1:1, placed in a beaker, mixed vigorously for 10 minutes, and left until layer separation occurred. For analysis, after obtaining a small amount of sample in the organic solvent layer, the content of EC was analyzed and all water was carefully removed from the remaining organic solvent layer. Then, the same amount of fresh water was charged in a beaker containing the organic solvent layer, followed by vigorous mixing for 10 minutes. The content of EC in the organic solvent layer was analyzed in the same manner. This method was then repeated one more time.

As a result, the content of EC before extraction was 14.68%, and it was found that the content of EC was 10.28% after the first extraction, 6.41% after the second extraction, and 4.26% after the third extraction.

Reference Example 3

Multistage Extraction Experiment of Number of 10 Times

The extraction experiment was performed in the same manner as in Reference Example 2, but was performed up to 10 times. As a result, the final EC content was shown to be 0.95%.

Example 1

<Method for Purifying Polyethylene Carbonate Using Multistage Extraction Column>

Multistage Extraction of Number of 3 Times

By using the Karr type of multistage extraction column of the Drawing under the following conditions, a continuous extraction test was performed on the polymerization solution of Preparation Example 1 to remove by-products.

Controllable Parameters

1. Linear velocity/flow velocity: 0.3 cm/s or 0.6 cm/s, determined by the system
2. Rotating speed: 150 to 180 rpm (affects dispersion degree and droplet size)
3. Ratio of injecting water in a polymerization solution (solvent to feed ratio, S/F): 1 or 2
4. Polymer solution injection viscosity (Feed viscosity): 200 cP or 60 cP Fixed Parameters 1. Number of stages: 50
   A. Top (larger in diameter): 6 stages
   B. Bottom (smaller in diameter): 44 stages
2. Spacing among plates
   Plate geometry: the top plate had a free open space of about 54.9% through feed droplets, and the bottom plate had a free open space of about 34.7%.

A sample in which the content of EC in the polymerization solution was 21.36 wt % was used as a feed, and was fed to the feed inlet 110 on the upper part of the multistage extraction column of the Drawing. Then, water was fed to the solvent inlet 210 of the multistage extraction column, and the multistage extraction was continuously performed in the extraction unit 200 through mechanical stirring.

In this case, TSC (Total Solid Content) was 10 wt %, and the viscosity of the polymerization solution fed to the feed inlet was 180 cP (measured by a Brookfield viscometer). The weight average molecular weight of the resin was 216 kg/mol. The extraction results are shown in Table 2 below.

TABLE 2

| | Extraction condition | | | | NMR data |
|---|---|---|---|---|---|
| | Linear velocity (cm/s) | Speed (rpm) | S/F | Operability | EC content in resin (wt %) |
| Raffinate 1-1 | 0.3 | 165 | 1 | Ok | 6.56 |
| Raffinate 1-2 | 0.3 | 180 | 1 | Ok | 7.04 |
| Raffinate 1-3 | 0.3 | 150 | 1 | Ok | 6.88 |

According to the present invention as shown in Table 2, when the EC content in the polymerization solution was 21.36 wt % through continuous operation using the multistage extraction column of the Drawing together with the conditions where the linear velocity, the stirrer velocity, and the S/F were specified, it was confirmed that the content was removed to 6.56 to 7.04 wt %, thereby controlling the by-product content to a certain level or less.

Example 2

Multistage Extraction of Number of 4 Times

A sample in which the content of EC in the polymerization solution was 6.35 wt % was used as a feed, and was fed to the feed inlet 110 on the upper part of the multistage extraction column of the Drawing. Then, water was fed to the solvent inlet 210 of the multistage extraction column, and the multistage extraction was continuously performed in the extraction unit 200 through mechanical stirring. The operation parameter conditions of the multistage extraction column are the same as in Example 1.

In this case, TSC was 9.53 wt %, and the viscosity of the polymerization solution fed to the feed inlet was 55 cP (measured by a Brookfield viscometer). The weight average molecular weight of the resin was 187 kg/mol. The extraction results are shown in Table 3 below.

TABLE 3

| | Extraction condition | | | | NMR data |
|---|---|---|---|---|---|
| | Linear velocity (cm/s) | Speed (rpm) | S/F | Operability | EC content in the resin (wt %) |
| Raffinate 2-1 | 0.3 | 180 | 1 | OK | 1.81 |
| Raffinate 2-2 | 0.3 | 165 | 1 | OK | 2.06 |
| Raffinate 2-3 | 0.6 | 150 | 2 | OK | 0.75 |
| Raffinate 2-4 | 0.3 | 160 | 2 | OK | 0.72 |

According to the present invention as shown in Table 3, when the EC content in the polymerization solution was 6.35 wt % through continuous operation using the multistage extraction column of the Drawing together with the conditions where the linear velocity, the stirrer velocity, and the S/F were specified, it was confirmed that the content could be removed to a range of 0.72 to 2.02 wt %.

While the present invention has been specifically described with reference to particular embodiments thereof, it will be apparent to those skilled in the art that this specific description is merely a preferred embodiment and that the scope of the invention is not limited thereby. It is therefore intended that the substantial scope of the invention be defined by the appended claims and their equivalents.

EXPLANATION OF SIGN

100: upper fixing part
110: Feed inlet
120: Extraction phase outlet
130: Drive assembly
200: Extraction unit
210: Solvent inlet
220: Raffinate
230: Interface between a heavy phase and a light phase
240: interface control unit
300: Lower fixing part

What is claimed is:

1. A method for purifying polyalkylene carbonate comprising the steps of:
   providing a polymerization solution of polyalkylene carbonate including a polyalkylene carbonate, a by-product, and a solvent; and
   continuously removing the by-product from the polymerization solution by a multistage extraction method using water at room temperature,
   wherein the multistage extraction method is performed in a multistage extraction column having at least 10 stages and equipped with a stirrer so as to maintain a feed linear velocity of 0.1 to 1 cm/s,
   wherein the rotating speed of the stirrer is 100 to 200 rpm,
   wherein a ratio between water and the polymerization solution of polyalkylene carbonate (S/F ratio) (Solvent/Feed ratio) is 1:1 to 5:1,
   wherein the viscosity of the polymerization solution of polyalkylene carbonate fed to the multistage extraction column is 50 to 180 cP, and
   wherein, based on the total weight of a final polyalkylene carbonate resin, the by-product content in the resin is 2% by weight or less.

2. The method for purifying polyalkylene carbonate according to claim 1, wherein the ratio between water and a polymerization solution of polyalkylene carbonate (S/F ratio) (Solvent/Feed ratio) is 1:1 to 3:1.

3. The method for purifying polyalkylene carbonate according to claim 1, wherein the multistage extraction column includes a multistage countercurrent extraction column for liquid-liquid extraction which is partitioned into at least ten or more plural stages by perforated plates and has an extraction unit having at least one baffle plate.

4. The method for purifying polyalkylene carbonate according to claim 3, wherein the extraction unit is partitioned into 10 to 150 stages, and the total length is 1 to 50 m.

5. The method for purifying polyalkylene carbonate according to claim 1, wherein the multistage extraction column includes a Karr column, a rotating disc contactor column, a Scheibel column, or a pulsed column.

6. The method for purifying polyalkylene carbonate according to claim 1, wherein the polymerization solution of polyalkylene carbonate is provided through polymerization of a monomer containing an epoxide compound and carbon dioxide in the presence of a catalyst and the solvent.

7. The method for purifying polyalkylene carbonate according to claim 6, wherein the catalyst is a zinc-based catalyst.

8. The method for purifying polyalkylene carbonate according to claim 6,
   wherein the epoxide compound is at least one selected from the group consisting of: an alkylene oxide having 2 to 20 carbon atoms which is unsubstituted or substituted with a halogen or an alkyl group having 1 to 5 carbon atoms; a cycloalkylene oxide having 4 to 20 carbon atoms which is unsubstituted or substituted with a halogen or an alkyl group having 1 to 5 carbon atoms; and a styrene oxide having 8 to 20 carbon atoms which is unsubstituted or substituted with a halogen or an alkyl group having 1 to 5 carbon atoms, and
   wherein the solvent is methylene chloride or ethylene dichloride.

9. The method for purifying polyalkylene carbonate according to claim 1, wherein the by-product includes an alkylene carbonate having 2 to 5 carbon atoms.

* * * * *